United States Patent [19]

Ince et al.

[11] Patent Number: 6,018,315
[45] Date of Patent: Jan. 25, 2000

[54] METHOD AND SYSTEM FOR ATTITUDE SENSING USING MONOPULSE GPS PROCESSING

[75] Inventors: Michael Dane Ince, Chandler; Robert H. Smith, Tempe, both of Ariz.

[73] Assignee: Motorola, Inc., Schaumburg, Ill.

[21] Appl. No.: 09/072,054

[22] Filed: May 4, 1998

[51] Int. Cl.[7] .............................. G01S 5/02; H04B 7/185
[52] U.S. Cl. ............... 342/357.11; 342/152; 342/357.06
[58] Field of Search .............................. 342/149, 80, 152, 342/352, 357.11, 357.06, 380–381, 383–384

[56] References Cited

U.S. PATENT DOCUMENTS

| | | | |
|---|---|---|---|
| 5,101,356 | 3/1992 | Timothy et al. | 364/449 |
| 5,296,861 | 3/1994 | Knight | 342/357 |
| 5,341,145 | 8/1994 | Eckersten et al. | 342/148 |
| 5,359,329 | 10/1994 | Lewis et al. | 342/17 |
| 5,463,656 | 10/1995 | Polivkov et al. | 375/200 |
| 5,757,316 | 5/1998 | Buehler | 342/357 |
| 5,831,570 | 11/1998 | Ammar et al. | 342/26 |

*Primary Examiner*—Thomas H. Tarcza
*Assistant Examiner*—Dao L. Phan
*Attorney, Agent, or Firm*—Harold C. McGurk; Frank J. Bogacz

[57] ABSTRACT

A space vehicle uses a signal received from a global positioning system (GPS) satellite (51, FIG. 1) to determine the attitude of a space vehicle. The signal is received through a pair of antennas (10, 11) and converted to sum and difference outputs by a sum and difference circuit (30). These outputs are then conveyed to down converter/correlators (55), and then to envelope detectors (60). The outputs of the envelope detectors (60) are then converted to a digital format by an analog to digital converter (70). The digitally formatted sum and difference amplitudes are then used by a processor (80) to calculate the required attitude adjustment to the space vehicle.

20 Claims, 4 Drawing Sheets

METHOD AND SYSTEM FOR ATTITUDE SENSING USING MONOPULSE GPS PROCESSING

FIELD OF THE INVENTION

The invention relates to space vehicles and, more particularly, to techniques for providing attitude control of a space vehicle.

BACKGROUND OF THE INVENTION

In a space vehicle, such as a communications satellite, it is often difficult to determine the precise attitude of the space vehicle. In a communications satellite, the need for precise attitude control enables the satellite to direct narrow beam communication signals to earth-based subscribers and control facilities. In other types of satellites, precise attitude control is useful in ensuring that solar panels which collect solar energy are constantly directed in the appropriate direction.

In a typical space vehicle, a device such as a magnetometer is used to determine the attitude of the vehicle based on changes in the geomagnetic field as the space vehicle travels in its trajectory. Because electronic systems on board the space vehicle can generate their own magnetic field, the field sensing elements of the magnetometer must be placed a suitable distance from the space vehicle electronics payload. Thus, the use of an attitude sensing magnetometer generally requires placement of the field sensing elements on a sizable boom in order to allow the accurate recording geomagnetic field information. The use of the magnetometer and the associated boom also increases the satellite mass.

A further drawback of a magnetometer is that the geomagnetic field must first be recorded prior to any actual attitude determination. During this recording process, the geomagnetic field is mapped and then correlated to the space vehicle's actual position. Thus, a secondary means for determining the space vehicle location must also be employed during this mapping process. This further complicates the use of a magnetometer for attitude sensing of a space vehicle. In addition, disturbances in the geomagnetic field caused by changes in sunspot activity can degrade the performance of the magnetometer.

Another method of determining the attitude of a space vehicle is through the use of a sun sensor. In a sun sensor, a beam of light from the sun enters through a small slit and illuminates a reticle unit. Based on the output of the reticle unit, the entry angle of the sunlight can be measured. In turn, the angle of the space vehicle can also be determined based on the reticle output.

A major drawback of the use of a sun sensor is that when the space vehicle is shadowed by the earth, no measurement can be made. Thus, no attitude determination can be made for long periods while the space vehicle is shadowed. Further, this approach can only provide two-axis information (roll and pitch), with rotation about the line of sight being unknown, requiring additional independent knowledge for resolution.

A third method of attitude determination makes use of a horizon sensor which typically senses the outlines of the earth or other body below the orbiting spacecraft using optical or infrared techniques. Geometrical algorithms are then used to derive two-axis information, such as roll and pitch attitude. A drawback to the horizon sensor approach is the potential for sun and moon interference which confuse the sensor. This approach also is limited to two-axis determination (roll and pitch), since no yaw information can be detected from outline sensing.

Therefore, what is needed are a method and system for accurate, continuous space vehicle attitude sensing using lightweight equipment that does not require prior magnetic field mapping in order to be effective in providing roll, pitch, and yaw information from a single measurement set of data.

DESCRIPTION OF THE PREFERRED EMBODIMENTS

The invention provides a simple and low-cost means of accurately determining the attitude of a space vehicle using signals from a GPS satellite. The invention enables the removal of the attitude sensing magnetometer or other device specifically intended for attitude determination on board a space vehicle. Additionally, near the center of coverage of the monopulse antenna beams used in the invention, angular accuracy is expected to be at least twice that of magnetometer performance. The GPS monopulse approach described herein is insensitive to geomagnetic anomalies caused by sunspot activity and the effects of on board electronic systems. Finally, the GPS monopulse approach does not require prior geomagnetic field mapping in order to be effective and can be used at all points in the space vehicle trajectory. Immunity from optical interference is also provided.

Figure 1:
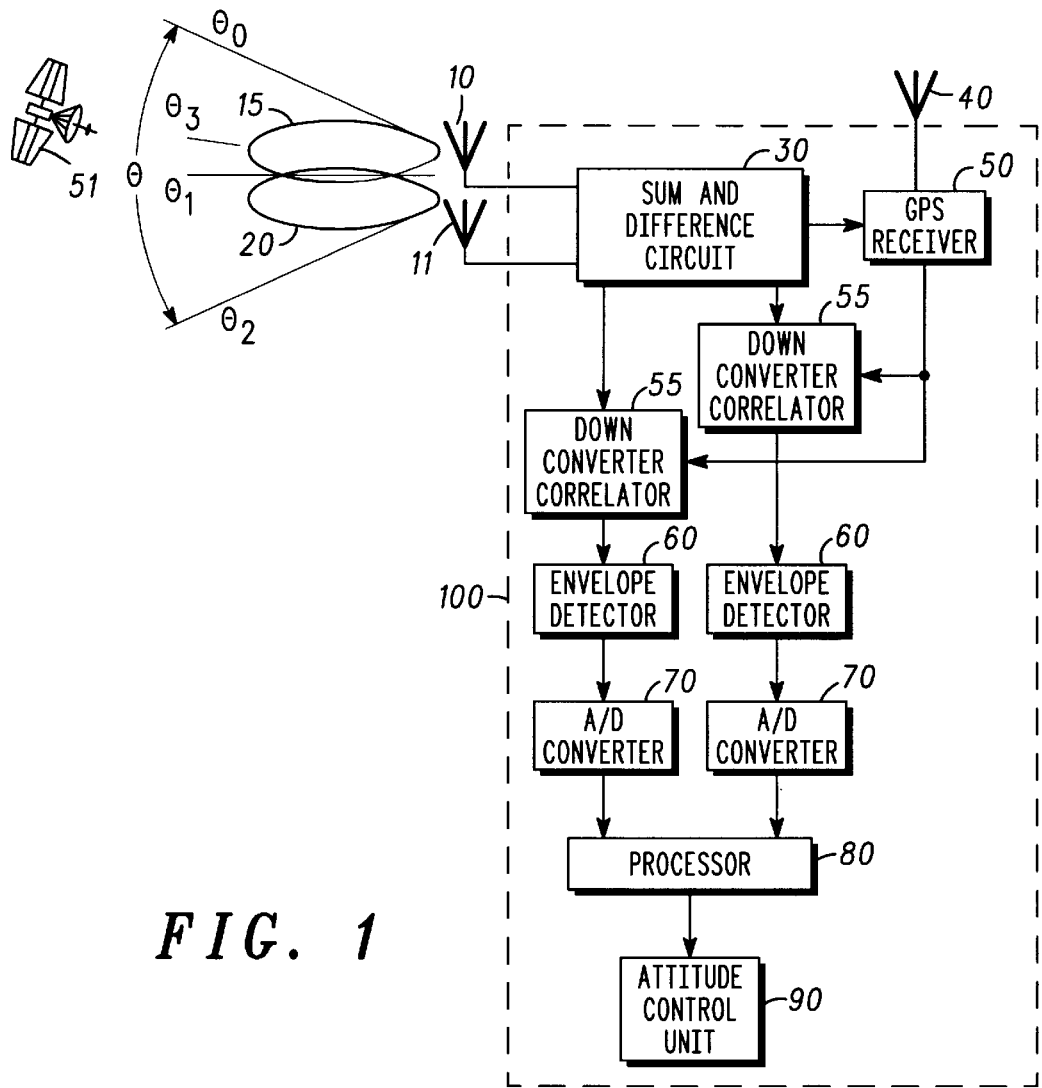
FIG. 1 illustrates a single axis monopulse sensor which uses a global positioning system signal in accordance with a preferred embodiment of the invention.

FIG. 1 illustrates a single axis monopulse sensor which uses a global positioning system signal in accordance with a preferred embodiment of the invention. System 100 of FIG. 1 can comprise the electronics payload of a communication satellite or other space vehicle in a geostationary or non-geostationary orbit. In FIG. 1, GPS satellite 51 broadcasts navigation information to system 100 as well as to other users of the GPS system. In a preferred embodiment, GPS satellite 51 represents a geostationary satellite in the GPS constellation operated by the United States Government. In an alternative embodiment, a geostationary satellite from an equivalent global positioning system, such as the GLONASS system currently operated by the Russian Federation, is used in lieu of GPS satellite 51.

In FIG. 1, system 100 comprises antennas 10 and 11 which receive energy from GPS satellite 51 through receive antenna beams 15 and 20. Receive antenna beam 15 receives power from within an angular area bounded by $\theta_0$ and $\theta_1$.

Receive antenna beam 20 receives power from within an angular area bounded by $\theta_1$ and $\theta_2$. In a preferred embodiment, system 100 receives a signal from GPS satellite 51 through either or both of receive antenna beams 15 and 20. As shown in FIG. 1, antennas 10 and 11 are directed toward slightly divergent angles so that receive antenna beams 15 and 20 slightly overlap each other at the angle denoted as $\theta_1$.

Antennas 10 and 11 can be of any type or construction such as a dipole, monopole above a ground plane, patch, or any other conductive element which receives an electromagnetic wave which induces an electrical current on the surface of the antenna. Additionally, the antennas 10 and 11 can also be of the aperture type such as a waveguide slot, horn, or any other type of nonconducting element which receives an electromagnetic wave which induces an electric field within the aperture. The only requirement of antennas 10 and 11 is that each must be capable of generating a receive antenna gain pattern with a contour that allows substantial energy to be received from sources within specified angular limits, such as $\theta_0$ and $\theta_1$, while allowing negligible energy to be received from sources outside these bounds. The techniques for the design and construction of antennas which possess these characteristics are well known to those of ordinary skill in the art.

Figure 2:
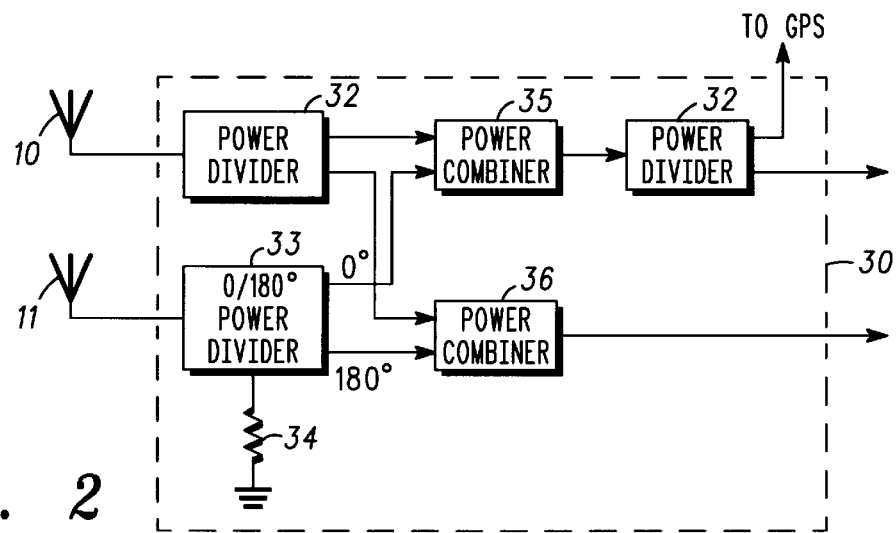
FIG. 2 illustrates a sum and difference circuit used in a single axis monopulse sensor in accordance with a preferred embodiment of the invention.

After being received by antennas 10 or 11, the signal from GPS satellite 51 is conveyed to sum and difference circuit 30 (described in detail in the discussion of FIG. 2). Within sum and difference circuit 30, a portion of the received signal from GPS satellite 51 is conveyed to GPS receiver 50. This allows GPS receiver 50 to identify GPS satellite 51 as being the desired satellite from which an attitude determination is to be made. If GPS satellite 51 is not the correct satellite, then system 100 can be rotated in azimuth in order to allow antennas 10 and 11 to generate receive beams from the correct GPS satellite. In a preferred embodiment, system 100 also comprises GPS antenna 40 which is used to receive signals from other GPS satellites so that the location of system 100 can be determined in accordance with the normal GPS navigation functions performed by system 100.

Sum and difference circuit 30 also conveys a signal which represents the sum of the power received by both antennas 10 and 11, as well as the difference in power received by antennas 10 and 11. The sum and difference channel outputs from sum and difference circuit 30 are then conveyed to down converter/correlator 55. Down converter/correlator 55 converts both received signals to a lower frequency in accordance with conventional down converting techniques. In a preferred embodiment, down converter/correlator 55 also accepts a signal having the pseudorandom noise (PN) code of the desired satellite from GPS receiver 50. Down converter/correlator 55 correlates the PN code of the sum and difference channel output with the PN code of the desired satellite from GPS receiver 50. Through this correlation down converter/correlator 55 ensures that only the correct satellite signal is being down converted by down converter/correlator 55. In addition to comprising a PN code input, down converter/correlator 55 also includes a mixer and local oscillator which enable the shift in frequency necessary to provide a down converted version of the input at the output of down converter/correlator 55. The techniques employed by down converter/correlator 55 to perform the correlation and down conversion tasks are well known to those skilled in the art.

The output of each down converter/correlator 55 is coupled to envelope detectors 60. Envelope detectors 60 provide a simple means for measuring the signal amplitude of the sum and difference channels. Envelope detectors 60 may comprise a crystal video detector or other wideband detection device which preserves signal envelope information. Other methods of envelope detection are known to those of skill in the art. The only requirement of envelope detectors 60 is that each must possess sufficient dynamic range in order to detect signals of varying amplitude from GPS satellite 51.

The output of each of envelope detectors 60 is coupled to one of analog to digital converters 70. Desirably, each of analog to digital converters 70 provides sufficiently high dynamic range and low quantization noise in order to allow an accurate digital representation of the analog signal incident at the input of each analog to digital converter 70.

Each analog to digital converter 70 is coupled to processor 80. Processor 80 incorporates sufficient memory and processing algorithms in order to determine the current attitude of system 100 based on the digital representations of the amplitudes of sum and difference channels from sum and difference circuit 30. For example, in the case of a signal received from GPS satellite 51 along angle $\theta_1$, processor 80 desirably determines that no attitude correction is required. In another example, for the case of a signal received at an angle $\theta_3$, processor 80 determines that system 100 must be tilted in order to enable the signal received from GPS satellite 51 to be received at the angle $\theta_1$. In this manner, processor 80 controls the attitude of system 100 through attitude control unit 90 until the energy received from GPS satellite 51 is minimized in the difference channel and maximized in the sum channel. The relationship of power received at the sum and difference channels relative to angle $\theta$ are described in detail in the discussion of FIGS. 3 and 4. In a preferred embodiment, when a signal is received at an angle $\theta_1$, processor 80 uses this as a reference point to determine the angles at which to point communications beams to service earth-based users.

In a preferred embodiment, processor 80 performs a comparison of the energy received through the sum and difference channels with stored values. This allows processor 80 to calculate the amount of attitude adjustment based on the first sample received from sum and difference circuit 30. This enables faster attitude adjustment of system 100. Processor 80 may also perform additional post-processing for improved error reduction. Since each line-of-sight to a particular GPS satellite provides a unique attitude solution, post-processing many such lines-of-sight according to well-known techniques can substantially reduce any attitude errors.

FIG. 2 illustrates a sum and difference circuit used in a single axis monopulse sensor in accordance with a preferred embodiment of the invention. In FIG. 2, the signal received from antenna 10 is coupled to power divider 32. Power divider 32 can be of any type and can be constructed of either lumped elements, such as resistors and capacitors, or distributed elements, such as a striplines, microstrips, or waveguides. Techniques of lumped and distributed power divider design are well known to those skilled in the art. Desirably, power divider 32 is capable of accurately dividing the power from antenna 10 at the GPS carrier frequency without excessive distortion.

In a preferred embodiment, 0/180 degree power divider 33 is coupled to antenna 11. As known to those skilled in the art, a 0/180 degree power divider provides substantially equal outputs which are in-phase and out-of-phase by 180 degrees. In an alternative embodiment, an in-phase power divider, such as power divider 32, is used and the necessary phase shifter elements are coupled to an output.

Also coupled to 0/180 degree power divider 33 is termination resistor 34. The role of termination resistor 34 is to terminate the unused port of 0/180 degree power divider 33 with a characteristic impedance such as 50 Ohms. The use of a termination resistor in order to provide a matched impedance at the output of a device such as 0/180 degree power divider 33 is well known to those skilled in the art.

Coupled to the outputs of power divider 32 and 0/180 degree power divider 33 are power combiners 35 and 36. Power combiner 35 provides the in-phase addition of signals from antennas 10 and 11. Similarly, power combiner 36 provides out-of-phase addition of the outputs of power divider 32 and 0/180 degree power divider 33. Power combiners 35 and 36 may be functionally identical to power divider 32 with the only difference being that the inputs and outputs have been reversed. In a preferred embodiment, additional power divider 32 is coupled to the output of power combiner 35 in order to provide a signal which can be used by GPS receiver 50 of FIG. 1.

Figure 3:
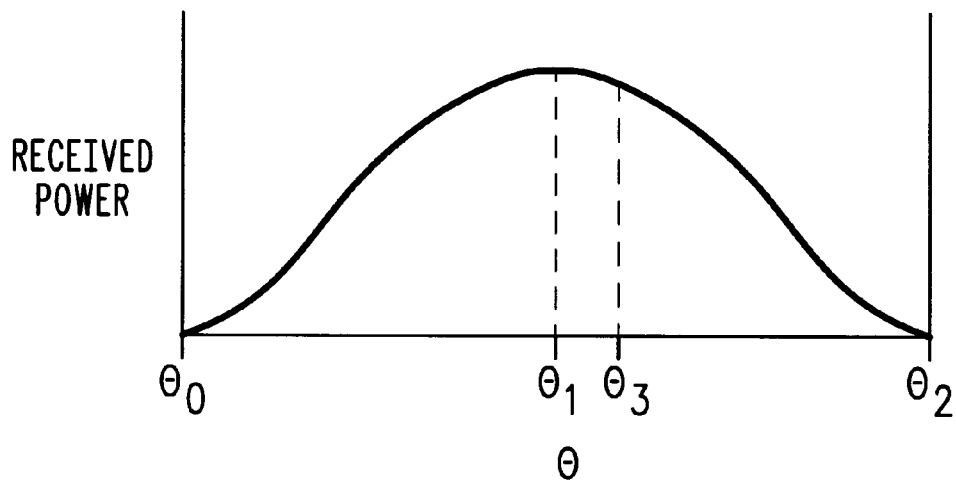
FIG. 3 illustrates the sum channel output of the sum and difference circuit described in FIG. 2 in accordance with a preferred embodiment of the invention.

FIG. 3 illustrates the sum channel output of the sum and difference circuit described in FIG. 2 in accordance with a preferred embodiment of the invention. In FIG. 3, the vertical axis provides an indication of received power while the horizontal axis indicates the angle θ as defined in FIG. 1. As can be seen in FIG. 3, a simple relationship between received power and angle θ exists. This simple relationship can be exploited by processor 80 to drive the attitude of system 100 by way of attitude control unit 90 in order to ensure that maximum power is received by the sum channel from sum and difference circuit 30.

Figure 4:
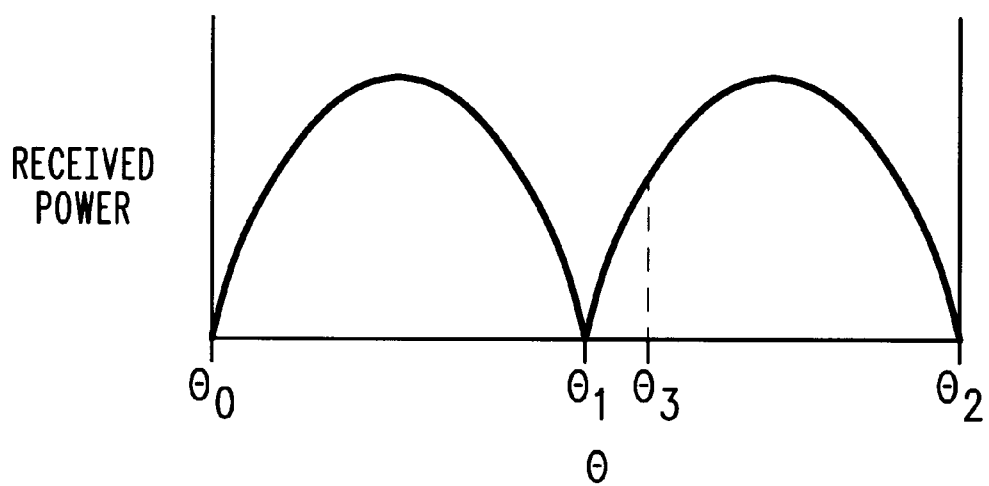
FIG. 4 illustrates the difference channel output of the sum and difference circuit of FIG. 2 in accordance with a preferred embodiment of the invention.

FIG. 4 illustrates the difference channel output of the sum and difference circuit of FIG. 2 in accordance with a preferred embodiment of the invention. In FIG. 4, the vertical axis indicates received power while the horizontal axis indicates an angle θ as defined in FIG. 1. From FIG. 4, it can be seen that when a signal from GPS satellite 51 is incident at an angle $θ_1$, the resulting difference channel output will approach zero. For a signal received at an angle of $θ_3$, processor 80 can drive the attitude of system 100 by way of attitude control unit 90 until the signal received in the difference channel approaches zero.

Figure 5:
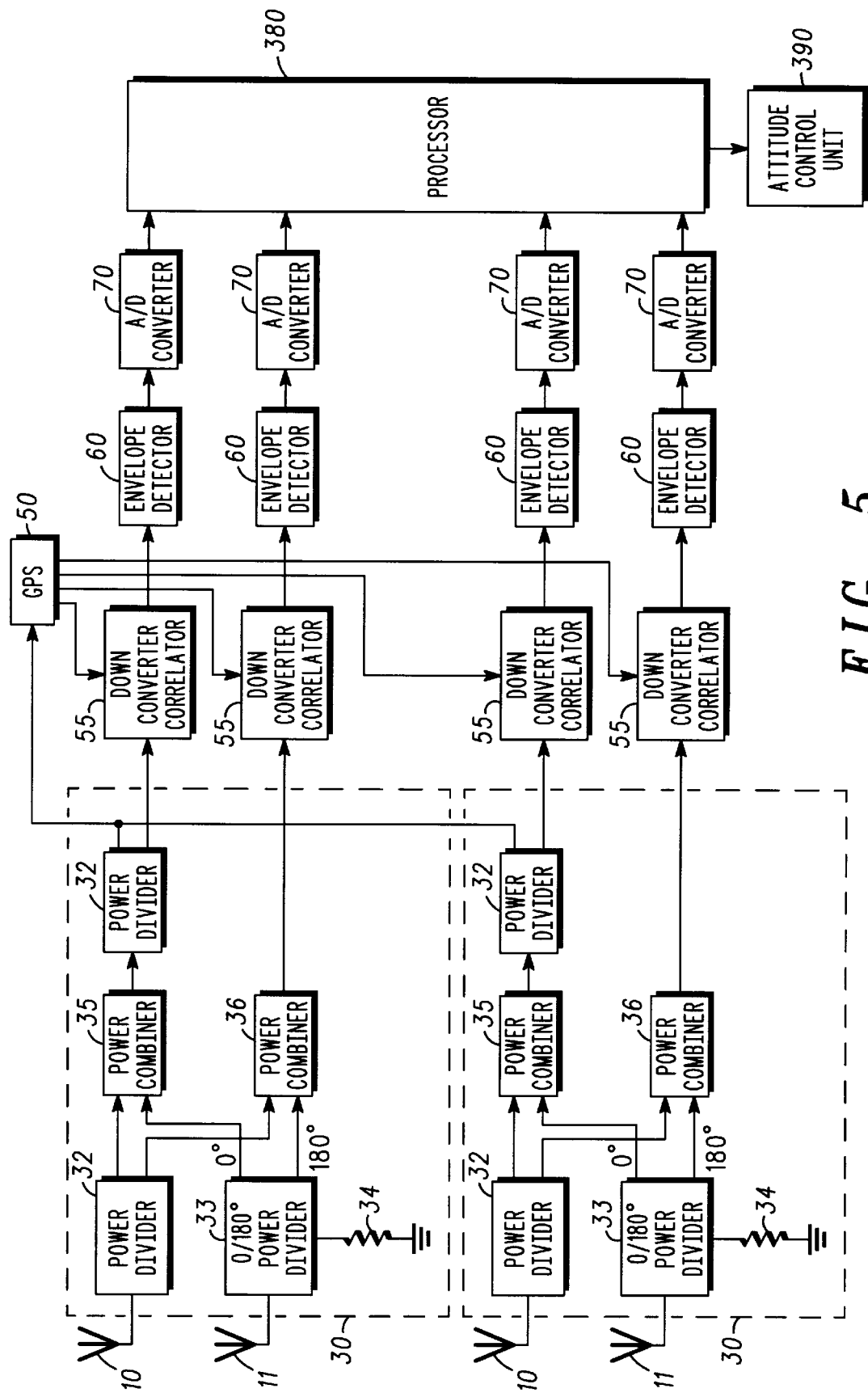
FIG. 5 illustrates a dual axis monopulse sensor which uses a GPS signal in accordance with a preferred embodiment of the present invention.

FIG. 5 illustrates a dual axis monopulse sensor which uses a GPS signal in accordance with a preferred embodiment of the present invention. In FIG. 5, antennas 10 and 11 are oriented in one axis, such as the elevation axis, while antennas 20 and 21 are oriented in another axis, such as the azimuth axis. The outputs of antennas 10 and 11 are coupled to a first sum and difference circuit 30 while the outputs of antennas 20 and 21 are coupled to a second sum and difference circuit 30. Each sum and difference output from sum and difference circuit 30 is coupled to down converter/correlator 55, and envelope detector 60. The outputs of envelope detector 60 are coupled to analog to digital converters 70. The output of each analog to digital converter 70 is coupled to an input of processor 380. In this embodiment, processor 380 uses the envelope information from analog to digital converters 70 to provide attitude control in both the elevation and azimuth axis. In this manner, a dual axis monopulse sensor using a GPS signal can be used to provide attitude control in two axes by way of two axis attitude control unit 390.

In another alternative embodiment (not shown), multiple pairs of antennas located around the space vehicle can be used to provide attitude sensing in different fields of view. Thus, according to the angular location of the desired GPS satellite, the appropriate antenna pair can be selected in order to perform attitude sensing. This technique of attitude sensing using other antenna pairs can be more cost-effective than the alternative technique of repainting of the entire system by way of space vehicle body rotation.

Figure 6:
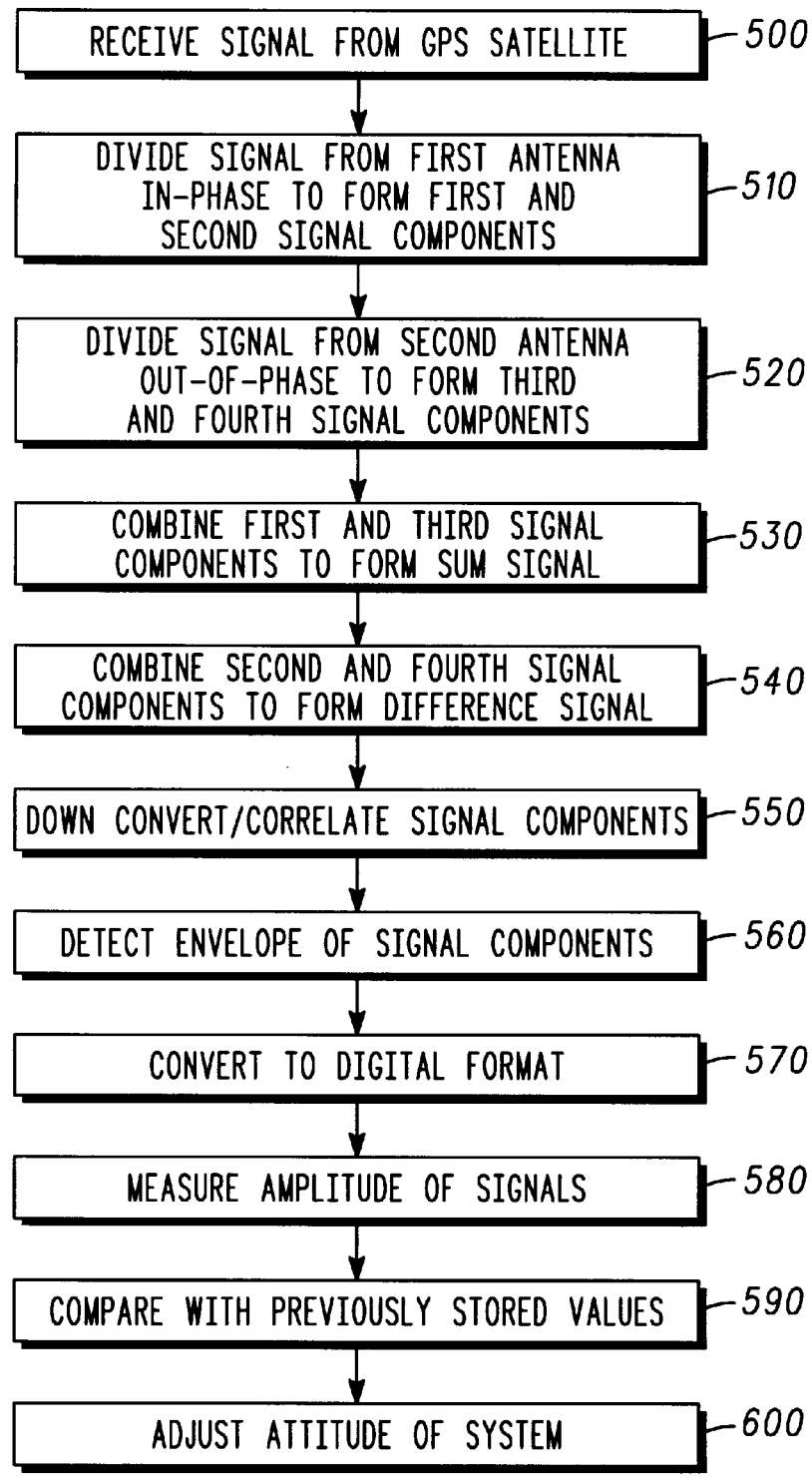
FIG. 6 illustrates a method for determining the attitude of a space vehicle using a signal received from a global positioning system satellite in accordance with a preferred embodiment of the invention.

FIG. 6 illustrates a method for determining the attitude of a space vehicle using a signal received from a global positioning system satellite in accordance with a preferred embodiment of the invention. System 100 of FIG. 1 is suitable for performing this method. The method begins with step 500 which comprises receiving a signal from a GPS satellite through a first and second antenna. In step 510, the signal from the first antenna is divided in-phase to form first and second signal components. In step 520, the signal from the second antenna is divided in phase and out-of-phase to form third and fourth signal components.

In step 530 the first and third signal components are combined to form a sum signal. In step 540, the second and fourth signal components are combined to form a difference signal. Step 550 comprises the step of down converting the sum and difference signals and correlating these with the desired satellite. In step 560 the envelope of the sum and difference signals is detected. In step 570, the sum and difference signals are converted from an analog format to a digital format.

Step 580 comprises the step of measuring the amplitude of the sum and difference signals. In step 590 the measured sum and difference signals are compared with previously stored values. The required attitude adjustment is then performed in step 600.

The invention provides a simple means of accurately determining the attitude of a space vehicle using signals from a GPS satellite. The invention enables the removal of the attitude sensing magnetometer or other device specifically intended for attitude determination on board a space vehicle. Additionally, near the center of coverage of the monopulse antenna beams used in the invention, angular accuracy is expected to be at least twice that of magnetometer performance. The GPS monopulse approach described herein is insensitive to geomagnetic anomalies caused by sunspot activity and the effects of on board electronic system. Finally, the GPS monopulse approach does not require prior geomagnetic field mapping in order to be effective and can be used at all points in the space vehicle trajectory.

Accordingly, it is intended by the appended claims to cover all modifications of the invention that fall within the true spirit and scope of the invention.

what is claimed is:

1. A system for determining an attitude and adjusting the attitude of a vehicle using a signal received from a global positioning system satellite, the system comprising:

a first and second antenna which receive a signal from the global positioning system satellite;

a sum and difference circuit coupled to the first and second antennas which converts the signal to a sum signal and a difference signal;

a processor coupled to the sum and difference circuit which determines the attitude of the vehicle using the sum signal and the difference signal; and an attitude control unit coupled to said processor for adjusting the attitude of the vehicle using the sum signal and the difference signal.

2. The system recited in claim 1, wherein the first and second antennas are directed toward divergent angles.

3. The system recited in claim 1, wherein the sum and difference circuit additionally comprises a power divider coupled to the first and second antennas.

4. The system recited in claim 3, wherein the power divider additionally comprises a phase shifter coupled to an output.

5. The system recited in claim 4, wherein the phase shifter is a 0/180 degree phase shifter.

6. The system recited in claim 3, wherein the sum and difference circuit additionally comprises a power combiner coupled to an output of the power divider.

7. The system recited in claim 1, wherein the system additionally comprises a down converter coupled to an output of the sum and difference circuit.

8. The system recited in claim 7, wherein the down converter comprises a correlator which correlates a PN code from a GPS receiver with a PN code from a sum and difference signal.

9. The system recited in claim 1, wherein the system additionally comprises an envelope detector.

10. The system recited in claim 1, wherein the system additionally comprises an analog to digital converter.

11. The system recited in claim 1, wherein the system is in a non-geostationary orbit.

12. A method for determining an attitude and adjusting the attitude of a vehicle using a signal received from a global positioning system satellite, the method comprising:

receiving the signal through a first and second antenna;

converting the signal from the first and second antennas into a sum signal and a difference signal;

calculating the attitude of the vehicle using the sum signal and the difference signal; and adjusting the attitude of the vehicle using the sum signal and the difference signal.

13. The method of claim 12, wherein the converting step comprises the steps of:

in-phase dividing of the signal from the first antenna to form first and second signal components; and in-phase and out-of-phase dividing of the signal from the second antenna to form third and fourth signal components.

14. The method of claim 12, wherein the converting step further comprises the steps of:

combining the first and third signal components to form the sum signal; and combining the second and fourth signal components to form the difference signal.

15. The method of claim 14, wherein the converting step further comprises the step of correlating a PN code from a sum signal with a PN code from a desired satellite.

16. The method of claim 14, wherein the converting step further comprises the step of correlating a PN code from a sum signal with a PN code from a desired satellite.

17. The method of claim 12, wherein the converting step further comprises the step of performing an analog to digital conversion on the sum and difference signals.

18. The method of claim 12, wherein the converting step further comprises the step of detecting an envelope of the sum and difference signals.

19. The method of claim 12, wherein the calculating step comprises the step of measuring an amplitude of the sum and difference signals.

20. The method of claim 19, wherein the calculating step further comprises the step of comparing the amplitude with previously stored values.

* * * * *